US012161217B1

(12) United States Patent
Chappell et al.

(10) Patent No.: US 12,161,217 B1
(45) Date of Patent: Dec. 10, 2024

(54) APPARATUS AND METHOD FOR A TOP WRAP ASSEMBLY

(71) Applicant: Quick Quack Car Wash Holdings, LLC, Roseville, CA (US)

(72) Inventors: Christopher Clinton Chappell, Lincoln, CA (US); McNamara Marlow Pope, III, Fair Oaks, CA (US); Rodney Daniel Sparks, Antelope, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/660,792

(22) Filed: May 10, 2024

(51) Int. Cl.
| | |
|---|---|
| A46B 13/00 | (2006.01) |
| A46B 13/02 | (2006.01) |
| A46D 3/00 | (2006.01) |
| B60S 3/04 | (2006.01) |
| B60S 3/06 | (2006.01) |
| A46B 3/00 | (2006.01) |
| A46B 9/02 | (2006.01) |
| A46D 1/00 | (2006.01) |

(52) U.S. Cl.
CPC ............ *A46B 13/003* (2013.01); *A46B 13/02* (2013.01); *A46D 3/00* (2013.01); *B60S 3/06* (2013.01); *A46B 3/00* (2013.01); *A46B 9/026* (2013.01); *A46B 2200/3046* (2013.01); *A46D 1/0253* (2013.01); *A46D 1/0276* (2013.01); *B60S 3/04* (2013.01)

(58) Field of Classification Search
CPC ..... A46B 13/001; A46B 13/003; A46B 13/02; A46B 2200/3046; B60S 3/04; B60S 3/06; B60S 3/063; B60S 3/066; A46D 3/00

USPC ................................................ 15/53.2–53.3
See application file for complete search history.

(56) References Cited

U.S. PATENT DOCUMENTS

| 7,219,385 | B1 | 5/2007 | Rietsch, Jr. | |
|---|---|---|---|---|
| 8,181,303 | B2 | 5/2012 | Vivyan et al. | |
| 2004/0185762 | A1* | 9/2004 | Turch | A46B 3/04 |
| | | | | 451/490 |
| 2004/0200024 | A1 | 10/2004 | Yamin | |

(Continued)

FOREIGN PATENT DOCUMENTS

KR    10-0919923 B1 * 10/2009 ............... B60S 3/06

OTHER PUBLICATIONS

Ninja Brush, Passenger Side; Autowash Online website, accessed Dec. 26, 2023.

*Primary Examiner* — Laura C Guidotti
(74) *Attorney, Agent, or Firm* — Caldwell Intellectual Property Law (57) ABSTRACT

Apparatus and methods for an apparatus and method for a top wrap assembly is disclosed. The top wrap assembly includes a plurality of buns, wherein the plurality of buns comprises a plurality of assembled layers, wherein the plurality of buns defines a central bore, at least one shaft, wherein the at least one shaft is disposed in alignment with the central axis of the plurality of buns, wherein the at least a shaft is passes through the central bore, and a plurality of locking mechanisms, wherein each locking mechanism is configured to engage with the plurality of buns and the at least one shaft, wherein the locking mechanism is configured to secure the plurality of buns and the at least one shaft. The method comprises using the at least one shaft to execute the process described above.

18 Claims, 8 Drawing Sheets

(56) References Cited

U.S. PATENT DOCUMENTS

2014/0345071 A1* 11/2014 Belanger .............. A46B 13/003
15/53.2

* cited by examiner

APPARATUS AND METHOD FOR A TOP WRAP ASSEMBLY

FIELD OF THE INVENTION

The present invention generally relates to the field of mechanical devices. In particular, the present invention is directed to an apparatus and method for a top wrap assembly.

BACKGROUND

In the field of mechanical cleaning devices, particularly those designed for large-scale or industrial applications such as car wash systems, there exists a technical challenge associated with the efficient and thorough cleaning of surfaces. Traditional cleaning assemblies must strike a delicate balance between robustness to withstand substantial operational stresses and the flexibility to adapt to a variety of surface contours and textures. Moreover, these systems often encounter the technical problem of maintaining structural integrity and reliable performance over prolonged usage, which is exacerbated by the high forces and repetitive movements inherent in their operation. The challenge is further compounded by the need to minimize noise and vibration, which can be disruptive in certain environments and detrimental to the longevity of the device. Additionally, the assembly and maintenance of such cleaning systems present logistical challenges, as they require a design that allows for easy assembly, disassembly, and replacement of parts, all while ensuring safety and preventing operational downtime.

SUMMARY OF THE DISCLOSURE

In an aspect, an apparatus for a top wrap assembly is described. The top wrap assembly includes a plurality of buns, wherein the plurality of buns includes a plurality of assembled layers, wherein the plurality of buns defines a central bore, at least one shaft, wherein the at least one shaft is disposed in alignment with the central axis of the plurality of buns, wherein the at least a shaft is passes through the central bore, a plurality of locking mechanisms, wherein each locking mechanism is configured to engage with the plurality of buns and the at least one shaft, wherein the locking mechanism is configured to secure the plurality of buns and the at least one shaft.

In another aspect, a method for a top wrap assembly is described. The method includes combining, using at least one shaft, a plurality of buns, wherein the plurality of buns comprises an assembled layers, the method includes assembling, using the at least one shaft, the at least one shaft is configured to be encased by the plurality of buns, inserting, using the at least one shaft, a plurality of locking mechanisms onto the at least one shaft, wherein the at the plurality of locking mechanism disposed with the plurality of buns, wherein the plurality of locking mechanism is configured to secure the plurality of buns onto the at least one shaft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a top wrap assembly. In an embodiment, the top wrap assembly may be designed to accommodate a series of mechanical components in a modular fashion, allowing for a customizable configuration that can be adapted to various operational requirements. The apparatus incorporates a unique assembly of parts that are structured to facilitate the efficient execution of tasks such as cleaning, buffing, or surface treatment across a range of industries.

Aspects of the present disclosure can be used to enhance the durability and resilience of cleaning assemblies under intensive use conditions. Aspects of the present disclosure can also be used to optimize the distribution of mechanical forces across the assembly, thereby reducing wear and extending the service life of the components. This is so, at least in part, because the disclosed apparatus and methods contemplate an innovative approach to the distribution and absorption of vibrational energy throughout the assembly, potentially leading to a quieter operation.

Figure 1:
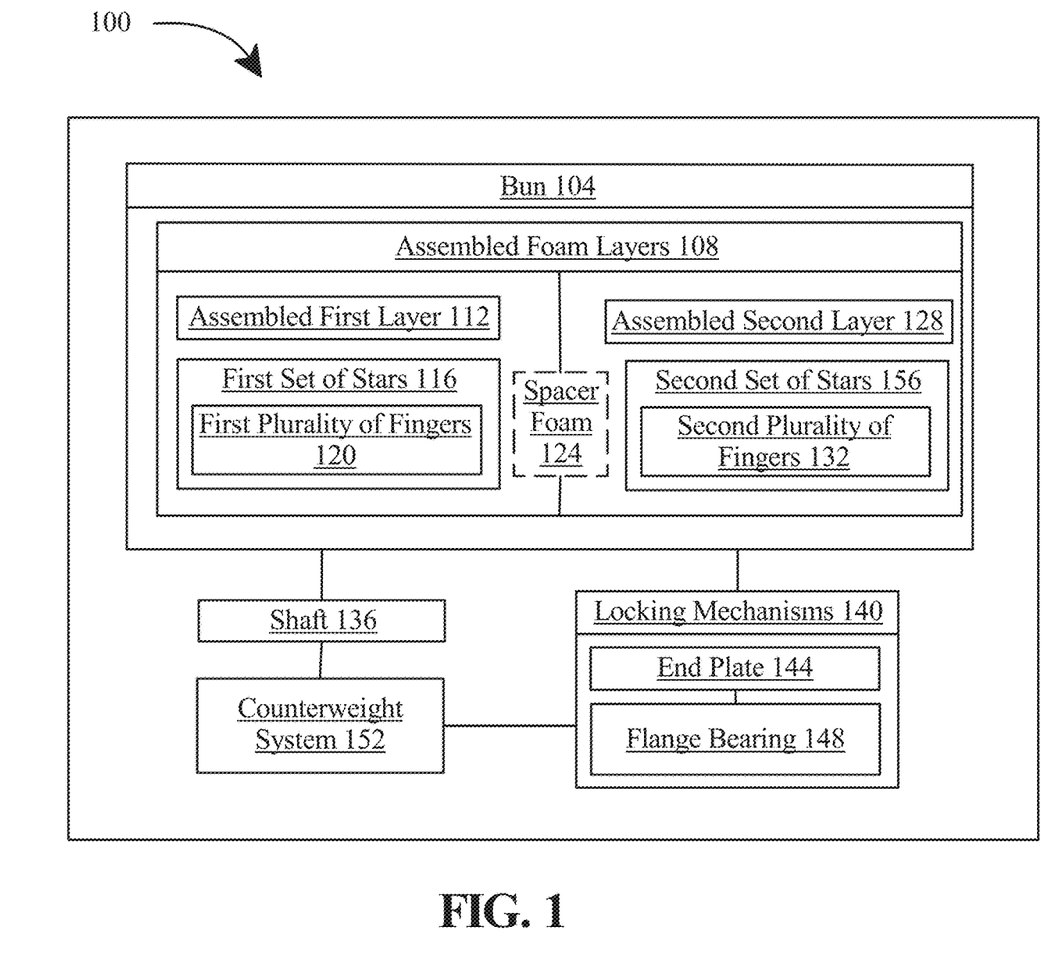
FIG. 1 is a block diagram of an exemplary apparatus for a top wrap assembly.

Now referring to FIG. 1, an apparatus 100 for a top wrap assembly comprises a plurality of buns 104. As used in this disclosure, a plurality of "buns" refers to multiple stacked or assembled layers of a specific material, such as foam or a similar substance. Each bun in the plurality may be designed to perform a specific function within apparatus 100, including roles such as cushioning, providing structural support, or enhancing the operational efficacy of the top wrap assembly. Buns 104 may be configured to work in concert within the apparatus, contributing to its overall performance and functionality. Plurality of buns 104 comprises a plurality of assembled layers 108, wherein plurality of buns 104 defines a central bore. A plurality of "assembled layers," for the purpose of this disclosure, refers to multiple layers of foam that are stacked or arranged together to form a cohesive unit. Multiple layered configurations may enhance the frequency of contact with the vehicle during operation. The layering may allow for a continuous and overlapping cleaning action. Each layer may be made from foam material, cotton material, polyester material, etc., chosen for its properties such as cushioning, flexibility, and durability. The layering may ensure a continuous and overlapping cleaning action, covering every inch of the vehicle's surface with precision. Assembled layers 108 collectively form what is referred to as bun 104. Assembled layers may work in synergy, with each layer potentially varying in density, thickness, or foam type, to achieve the desired overall performance characteristics such as impact absorption, structural support, or specific mechanical properties such as quieter operations. As used in this disclosure, a "central bore" refers to a hollow, cylindrical space or opening that runs through the center of plurality of buns 104. The central bore may be aligned along the longitudinal axis of buns 104 and may be designed to accommodate additional components of apparatus 100.

As continued referring to FIG. 1, in an embodiment, plurality of assembled layers 108 may include at least one assembled first layer 112. As used in this disclosure, the at least one "assembled first layer" refers to one or more initial layers in plurality of assembled layers that form part of the buns in the top wrap assembly. First layers may be characterized by specific properties or configurations that distinguish the layer from subsequent layers in the assembly. The characteristics of at least one assembled first layer 112 may include a particular foam density, thickness, resilience, or a unique structural design. At least one assembled first layers 112 may be positioned at the beginning of the layering sequence and play a foundational role in the overall structure and functionality of the buns. At least one assembled first layer 112 may include a first set of stars 116 including four individual stars with a first plurality of fingers 120. As used in this disclosure, "fingers" refers to elongated, curved projections that are integral components of a specific form, such as the stars in the assembled layers of the top wrap assembly. Fingers may be characterized by their slender, arcuate shape, which allows them to extend outward in a curved manner from the main body of the form they are part of. Fingers may be tailored to enhance functional effectiveness, potentially aiding in tasks like cleaning, gripping, or providing flexible support. Each finger may be designed to be flexible yet sturdy, enabling it to interact effectively with various surfaces or materials while maintaining its structural integrity. The curved nature of the fingers may contribute to the overall functionality of apparatus, allowing for more efficient coverage, improved contact with uneven surfaces, or enhanced mechanical action depending on the specific application of top wrap assembly. As used in this disclosure, "star" refers to an arrangement of fingers radiating from a central hub. A plurality of assembled layers 108 may include stars, wherein each star may include seven fingers. For instance, a non-limiting example of fingers and star as described in this disclosure can be seen in a car wash top wrap assembly. In this example, each star may form part of a cleaning element, with its seven curved fingers designed to gently yet effectively contact and clean the surface of a vehicle. The fingers, with their arcuate shape, can conform to the contours of the vehicle, ensuring thorough cleaning coverage. In some embodiments, each finger of a start comprises a straight portion and a curved portion. In another embodiment, the straight portion of each finger extends for approximately fifty percent of the total length of each finger and the curved portion increases in curvature towards a tip of each finger. The foam components, which may include fingers, stars, layers, and buns in top wrap assembly, may be made from a variety of materials, each chosen for its specific properties and suitability for the cleaning task. Common materials may include polyurethane foam, known for its flexibility and durability, or polyethylene foam, chosen for its lightweight and water-resistant qualities. Another possibility is ethylene-vinyl acetate (EVA) foam, which may offer a good balance of softness and resilience. These foams may be formulated with varying densities and firmness to suit different cleaning applications, from gentle surface wiping to more abrasive scrubbing. The choice of material may significantly impact the performance of the cleaning element, particularly in terms of its longevity, effectiveness, and suitability for different vehicle surfaces. At the base of curved design for fingers, the angle of the fingers might start relatively straight, aligning closely with the radial direction of star. As the finger extends, it may gradually curve, with the angle at the tip differing significantly from the base. This difference in angle may range from 10 to 65 degrees, with examples including fingers where the angle difference between the tip and base of a finger is 15 degrees, 30 degrees, or even more pronounced at 45 degrees. In some embodiments, the curvature may not extend through the entire length of finger. For example, the first 25% to two-thirds of finger's length may remain straight, with the curving section starting thereafter. In some embodiments, the first 50% of the finger length May be straight before the next 50% curves. Fingers may also feature a tapered design, being thicker at the base where they attach to the star and gradually narrowing towards the tip. Tapering may range from a base thickness of 2-5 mm, slimming down to 1-3 mm at the tip. Such a design may ensure fingers have enough rigidity at the base to withstand the pressures of cleaning while the narrower tip provides flexibility and gentleness. The combination of curved and tapered geometry may enable the fingers to clean effectively and safely. The combination of straight and curved finger portions allows for more effective cleaning, reduced noise level, and enabling apparatus to adeptly handle a variety of surfaces and contours with improved efficiency.

With continued reference to FIG. 1, in an embodiment, plurality of assembled layers 108 may include an individual star with a plurality of fingers. As a non-limiting example, the use of plurality of assembled layers 108 in a commercial cleaning apparatus. Each individual star within the foam layers may be part of the scrubbing component. The star, equipped with a plurality of fingers, may be positioned within the plurality of assembled layer 108 to maximize cleaning efficiency. The fingers, due to the design, may be capable of flexibly adapting to various surface contours and textures, making them ideal for thorough cleaning applications. The number of fingers in each star may vary depending on the specific requirements of application. For example, a star may have 5 to 24 fingers, with common configurations including 7, 10, or even 20 fingers. This range may allow for varying degrees of surface coverage and cleaning intensity. A star with 7 fingers might be used for more detailed cleaning tasks focused on precision, while a star with up to 20 or 24 fingers may offer broader coverage for larger surfaces. In a car wash setting, for example, fingers of each star would scrub the surface of a vehicle, reaching into crevices and over curves, thus ensuring a comprehensive cleaning process. In another embodiment, wherein each finger of first and second set of stars comprises a swept shape. As used in this disclosure, a "swept shape" is a specific design characteristic of fingers where fingers exhibit a noticeable curvature or arc. Swept shape may not be linear or straight, instead, it may be characterized by a curved line that extends from the base to the tip of each finger. In some embodiments, the curvature of the line may increase as the finger moves from base to tip. For example, the swept shape of the fingers may be engineered to provide functional advantages such as improved surface contact, enhanced cleaning efficiency, or more effective distribution of mechanical forces during the operation of the apparatus. In an additional embodiment, wherein each finger of first and second set of stars may include a curved configuration configured to reduce noise in the vehicle by over five decibels. For example, in an automotive detailing facility, the curved configuration of the fingers in the first and second set of stars may be employed in a polishing apparatus. When apparatus may be used on the surface of a vehicle, the curved fingers gently glide over the contours of the car, effectively polishing the surface while significantly reducing noise levels. Reduction in noise may be advantageous in the enclosed environment of a detailing facility, where excessive sound may be disruptive. Additionally, the curvature of fingers may ensure the polishing action is evenly distributed across the surface, minimizing the risk of damage to the vehicle's paintwork.

Still referring to FIG. 1, in an embodiment, wherein at least one assembled second layer comprises a second set of stars comprising four individual stars with a second plurality of fingers. As used in this disclosure, a "second set of stars" is a group or arrangement within at least one assembled second layer of the top wrap assembly. The second set may include four individual star-shaped elements, each forming an essential part of the second layer. Each star in the second set may be equipped with a "second plurality of fingers" as used in this disclosure, is projections extending outwardly from the star's core. The second plurality of fingers may be the same or differ in number, length, curvature, or flexibility compared to those in the first set, tailored to meet specific functional requirements or operational conditions of apparatus. For instance, application of second set of stars may be illustrated in a specialized cleaning apparatus used in industrial settings. In this example, the second set of stars, each with plurality of fingers, may be specifically designed to handle tougher or more resilient dirt and debris compared to the first set. Second set fingers may be stiffer or have a different curvature, with second set fingers may be scrubbed harder surfaces without causing damage. This arrangement may allow apparatus to effectively clean a wide range of surfaces, from delicate to rugged, by utilizing the distinct properties of both the first and second sets of stars. By merging both the first and second sets of stars, apparatus may achieve cleaning performance, reduce noise level, and adeptly conform to and efficiently cleaning a wide range of surface profiles and irregularities.

With continued reference to FIG. 1, in an embodiment, plurality of assembled layers 108 may comprise a spacer foam 124 configured to separate at least one assembled first layer 112 and the at least one assembled second layer 128. As used in this disclosure, a "spacer foam" is a type of foam object used to separate layers of the plurality of assembled layers from each other. still referring to this disclosure, an "assembled second layer" is one of the layers within the plurality of assembled layers 108 that is distinct from the first layer in its composition, structure, or intended function. The at least one assembled second layer 128 may be characterized by its own set of features, such as a different foam density, thickness, or the incorporation of unique elements like the second set of stars. Within this configuration, the thickness of spacer foam 124 situated between the layers. Spacer foam may vary in thickness, potentially ranging from a few millimeters to several centimeters, to provide the necessary separation between the layers. For example, spacer foam 124 thickness may range from 4 mm to 50 mm. This thickness may be carefully selected based on the requirements for cushioning, insulation, or to accommodate the movement or flexing of the fingers. The specific dimension of the spacer foam thickness is determined not only to achieve optimal functionality but also to ensure compatibility with the surrounding components and the overall design of the top wrap assembly. For example, the spacer foam 124 may be configured to act as a separating component between at least one assembled first layer 112 and at least one assembled second layer 128. Spacer foam may provide a defined gap or space between both layers. Spacer foam may be selected for its properties such as thickness, density, and resilience, spacer foam may be made of polyethylene (PE) foam, ethylene-vinyl acetate (EVA) foam, polyurethane foam, cross-linked polyethylene foam, expanded polystyrene (EPS) foam, and neoprene foam, etc. In a non-limiting example, spacer foam may be made of a high-density polyethylene (HDPE) foam. HDPE foam material may be chosen for the cushioning properties, durability, and resistance to moisture and chemicals. HDPE foam is also known for its ability to maintain its shape and thickness under pressure, making it an ideal material for maintaining a consistent separation between the layers. Alternatively, a closed-cell polyurethane foam could be used for its superior sound dampening properties and resilience, contributing to the noise reduction capabilities of apparatus. The shape of spacer foam 124 may be a circular discs, rectangular strips, cylindrical rods, square pads, hexagonal inserts, and triangular wedges, etc. In non-limiting example, the shape of the spacer foam in the embodiment might be circular discs that fit precisely with the central bore of the buns onto the shaft. These discs would be cut to a specific diameter that aligns with the inner circumference of the buns, ensuring a snug fit. Alternatively, spacer foam may be in the form of rectangular strips that run along the length of the buns, providing separation along the entire interface between the first and second layers. A rectangular strip form would be especially useful in longer or larger apparatuses, where maintaining consistent spacing across a wide area is crucial.

With continued reference to FIG. 1, in an embodiment, wherein plurality of assembled first layer may further include the four individual first stars with plurality of first fingers 120. For example, four individual first stars within the first layer could be designed with fingers of specific length and flexibility to clean the more delicate parts of a vehicle, such as windows and mirrors. The length of the fingers may range from a few centimeters, suitable for small and tight spaces, up to longer lengths, exceeding ten centimeters, to extend across larger surface areas. For example, the length of fingers 120 may be from 2 cm to 100 cm. For example, the length of fingers 120 may be from 5 cm to 50 cm. For instance, shorter fingers measuring around 2-4 centimeters may be employed for intricate detailing around vehicle emblems and crevices, while longer fingers, perhaps 10-15 centimeters, may be effective for sweeping over broader expanses like windows and door panels. These lengths allow the fingers to provide precise cleaning action while maintaining flexibility to prevent damage to sensitive surfaces. The design of the first fingers could be optimized to prevent scratching while ensuring thorough cleaning. In another embodiment, wherein plurality of assembled second layer may further includes four individual second stars with the plurality of second fingers 132. For instance, consider the use of the second layer in a heavy-duty car washing machine. The four individual second stars of the second layer, may be equipped with a plurality of second fingers, may be designed for more aggressive cleaning compared to the first layer. Second fingers might be sturdier and have a different texture or composition, making them ideal for scrubbing away stains and residues on hard floor surfaces like concrete or industrial tiling. In a further embodiment, wherein top wrap assembly includes a full bun configuration consisting of eight layers of assembled layers. As used in this disclosure, a "full bun configuration" refers to a comprehensive and complete setup of the apparatus where all the individual layers are stacked or arranged together to form a cohesive unit. The full bun configuration may include eight layers of alternating assembled first and second layer. As used in this disclosure, "full" is all the necessary layers to achieve the desired operational capabilities, such as maximum cleaning effectiveness, durability, and adaptability to various cleaning scenarios. Four individual first stars with plurality of first fingers may contribute to the assembly's enhanced cleaning capabilities, reduced noise level, which ensuring it can seamlessly adapt to and thoroughly clean various contours and surfaces. In some embodiments, the full bun configuration comprises arrangement of multiple alternating layers. In one embodiment, the full bun configuration comprises an alternating arrangement of a first layer and a second layer.

Still referring to FIG. 1, top wrap assembly comprises at least one shaft. As used in this disclosure, a "shaft" is a long structural component of apparatus about which buns may be mounted. The shaft may be a long, cylindrical rod made of a durable material such as steel, aluminum, or a reinforced composite. Shaft 136 may be made of metal. Shaft 136 may be made of plastic. The Shaft's primary function may include providing a central axis around which the other components of the assembly, such as plurality of assembled layer, buns and stars, may be organized and supported. Shaft may serve as the backbone of apparatus 100 top wrap assembly, enabling the transmission of motion, supporting rotational functions, and bearing the load of apparatus during operation. Shaft's material and dimensions may be selected based on the specific requirements of top wrap assembly, such as its size, weight, and the operational stresses. For example, in an automated car wash system, shaft may be a stainless-steel rod designed to withstand the wet environment and resist corrosion. Its robust construction would support the rotation of buns and stars, ensuring efficient and even cleaning of vehicles as they pass through the wash system. In another example, shaft may be an oversized aluminum rod, chosen for its lightweight yet strong properties. It would support large, heavy buns and stars necessary for tough cleaning tasks on industrial machinery or floors.

With continued reference to FIG. 1, at least one shaft is disposed in alignment with the central axis of the plurality of buns, wherein the at least a shaft passes through the central bore. Initially, each bun, made up of assembled layers, may be prepared with a central bore, diameter of central bore may be consistently designed to match shaft. Shaft, may be made from a durable material such as steel or aluminum, chosen to slightly undersize compared to the bore to facilitate insertion while maintaining a snug fit. Alignment begins by positioning shaft with the central axis of the first bun, often assisted by visual alignment or a guiding tool for precision. Following this, shaft may be inserted through the bore of the first full bun. Procedure may be repeated for each bun, ensuring shaft passes through the central bore of all buns in a sequential manner. The order of the buns on the shaft may change and may be determined by specific types or properties. After all buns are placed onto the shaft, shaft may be secured using locking mechanisms or end caps at the ends of shaft, which prevent the buns from sliding off. Additional fasteners or adhesives may also be employed between the buns and the shaft to stabilize the assembly. In an embodiment, wherein at least one shaft may define a plurality of round holes and a plurality of oblong slots. As used in this disclosure, a "round hole" is a circular openings or perforations defined in at least one shaft 136 of apparatus 100. Round holes may be characterized by symmetrical round shape. Round holes can vary in size and are uniformly distributed along the shaft. The primary purpose of these round holes could be to reduce the overall weight of the shaft, facilitate the attachment of other components, or allow for the passage of elements like bolts or pins. For example, round holes may also be used in the alignment and securing of buns and stars or in providing points of articulation for moving parts of the apparatus. "As used in this disclosure, "oblong slots" are elongated openings or cutouts in shaft that are longer in one dimension than the other, resembling an extended circle or oval shape. Oblong slots may be strategically placed along the length of the shaft and may be designed to serve specific functions, such as, but not limited to allowing for adjustable connections, facilitating the alignment of components, accommodating elongated fasteners, or providing space for components to expand or move during operation. The oblong nature of these slots offers greater flexibility in terms of the positioning and attachment of various parts of apparatus compared to round holes. For example, round holes along the shaft could be used to attach various cleaning heads or brushes. By inserting fastening elements like bolts or pins through these round holes, different cleaning components can be securely fixed to shaft. Arrangement allows for quick and easy modification or replacement of parts, enhancing the versatility of the apparatus. Oblong slots, with their elongated shape, may be utilized to adjust the positioning of certain components along the shaft. For instance, apparatus may need to adapt to cleaning surfaces of varying heights, the oblong slots allow for components to be moved up or down the shaft and then locked into place. Adjustability provided by oblong slots may be useful in customizing the cleaning action for different types of surfaces or objects, ensuring apparatus can be efficiently used in a range of environments, from flat industrial to uneven surfaces.

Still referring to FIG. 1, apparatus 100 comprises a plurality of locking mechanisms 140. As used in this disclosure, a "locking mechanisms" is a device or system designed to securely fix or hold components of apparatus in a specific position or arrangement. Locking mechanisms may be in various forms depending on specific application within the assembly. Locking mechanism in this disclosure may include, but is not limited to, mechanical fasteners, such as bolts, screws, or clamps, which are strategically placed to ensure that the assembled parts, such as buns or foam layers, remain firmly attached to shaft or to each other. Locking mechanisms may be designed to prevent unintentional movement or disassembly of the parts during the operation of apparatus. Additionally, locking mechanism may allow for adjustable positioning or easy disassembly for maintenance and repair purposes. The materials and design of locking mechanisms may be chosen for their strength, durability, and suitability to the operational conditions of apparatus, such as exposure to water, chemicals, or mechanical stress. Each locking mechanism 140 is configured to engage with plurality of buns 104 and at least one shaft 136.

Wherein locking mechanism 140 is configured to secure plurality of buns 104 and at least one shaft 136. Locking mechanisms may be positioned at strategic points where buns and shaft intersect or align. For instance, locking mechanisms may include clamps, collars, or bolted brackets that encircle shaft and press against the buns. Locking mechanisms may have internal threading or adjustable features to tighten or loosen their grip on shaft. As shaft passes through central bores of the buns, locking mechanisms may lock into place, could be by a snap-fit, a screw action, or another fastening method. To ensure the buns are firmly held against shaft, preventing any axial or radial movement during operation. Locking mechanisms are often made of robust materials such as stainless steel to withstand the forces exerted during use. Furthermore, locking mechanisms may include features like rubber gaskets or padding to prevent damage to the buns and to absorb any vibration, enhancing the stability and longevity of the assembly. In some embodiment, locking mechanism 140 may further include spacer foam 124 positioned between locking mechanism and the buns. Spacer foam 124 includes a single sided adhesion connected to the buns. For example, spacer foam may be positioned between locking mechanism and the buns. Spacer foam may be equipped with single-sided adhesion, may be attached directly to the buns, providing a cushioning layer that prevents direct contact and potential wear or damage between locking mechanism and the buns. The adhesive side of the foam ensures a secure bond to the buns, maintaining consistent spacing and alignment. In another embodiment, locking mechanism 140 may include an end plate 144 configured to anchor locking mechanism to an external structure. In an additional embodiment, locking mechanism further includes a flange bearing 148 configured to facilitate a rotational movement of the shaft. Flange bearing may allow the shaft to rotate smoothly and freely while maintaining its alignment and position relative to the buns and other components.

With continued reference to FIG. 1, in an embodiment, top wrap assembly may include a counterweight system 152, wherein the counterweights may be configured to balance the top wrap assembly. As used in this disclosure, a "counterweight system" is a component designed to balance the weight distribution and stabilize an assembly. The counterweight system, comprising one or more weighted elements referred to as 'counterweights,' may be strategically integrated into apparatus. The counterweight system 152 may be to offset any uneven weight distribution or rotational imbalances that might occur during the operation of the top wrap assembly. This is particularly important in systems involving rotational motion or where parts of the assembly extend outward, creating potential for imbalance. The counterweights are usually made from heavy materials like steel or lead and are precisely positioned to counteract the specific weight and distribution of the other components. Counterweights may be adjusted or relocated within the assembly to achieve the desired balance, ensuring that the apparatus operates smoothly, efficiently, and with minimal stress on its components. Counterweights may be fabricated from dense materials like steel or lead and are carefully positioned in apparatus to counterbalance the weight of the rotating or extending components. Placement of counterweight may be determined based on factors such as the weight distribution of the buns and other parts, the rotational axis of the assembly, and the specific operational dynamics. Counterweights may be attached to shaft or other structural components in a way that allows for adjustment or repositioning. The technical process involves calculating the exact counterbalance needed to offset any asymmetrical weight or rotational forces that could lead to instability or undue stress on the apparatus. In some cases, the system might include sliding mechanisms or adjustable mounts for the counterweights, enabling precise positioning and secure attachment.

With continued reference to FIG. 1, apparatus 100 may include driver side (DS) and passenger side (PS) ends. DS end may start with green fingers and PS end may start with black fingers. Apparatus 100 may be configured to spin counterclockwise when viewed from the driver's side. In some embodiments, fingers may be swept in that direction. Aluminum end plates may be marked with "DS" and "PS". Installation may include placing apparatus 100 on a sawhorse. Installation may include loosening set screws on bearing. Installation of apparatus 100 may include, on driven end of shaft, moving bearing so shoulder of shaft protrudes about ⅛" from face of inner race of bearing. Installation may include pre-applying anti-seize compound to all bolts. Installation may include lifting driven end of shaft up to top washer arm and loosely installing two bolts and nuts. Installation may include tightening these two bolts so they are about ½ to 1 turn from tight and can move around. Installation may include loosening bearing set screw on non-driven end of shaft. Installation may include lifting non-driven end of shaft up to top washer arm, sliding bearing over to arm, and installing and tightening all bolts. Installation may include tightening bearing set screw on non-driven end of shaft. Installation may include cleaning the inside of motor shaft coupler. Installation may include removing and discarding old shaft key. Installation may include applying a thin film of anti-seize to inside of coupler and OD of shaft. Installation may include installing new key in coupler. Installation may include, with two bolts still loosely fastened on drive end, sliding motor assembly onto end of top wrap shaft, being sure to line up the key properly. Installation may include lifting up slightly on top wrap if needed to get the anti-rotation pin of the motor assembly into its hole on the top washer arm. Installation may include, with motor installed and shaft coupler bottomed out on shaft, tightening shaft coupler screws. Installation may include lifting up slightly on top wrap while tightening one bearing bolt in order to take load of the top wrap's weight off of motor. Installation may include installing two remaining bolts and tightening all bearing bolts on drive end of top wrap. Installation may include installing two remaining bolts and tightening all bearing bolts on drive end of top wrap.

With continued reference to FIG. 1, apparatus 100 may be set up for operation. Setting up for operation may include setting RPM for apparatus 100. Setting RPM may include measuring RPM using a tachometer. In some embodiments, setting up for operation may include adjusting a penetration depth. Penetration depth is the depth that a vehicle pushes past the tops of the fingers and into the wrap. Penetration depth may be adjusted to minimize noise, increase cleaning effectiveness, and avoid vehicle damage. In some embodiments, penetration depth may include calibration using a sedan.

Figure 2:
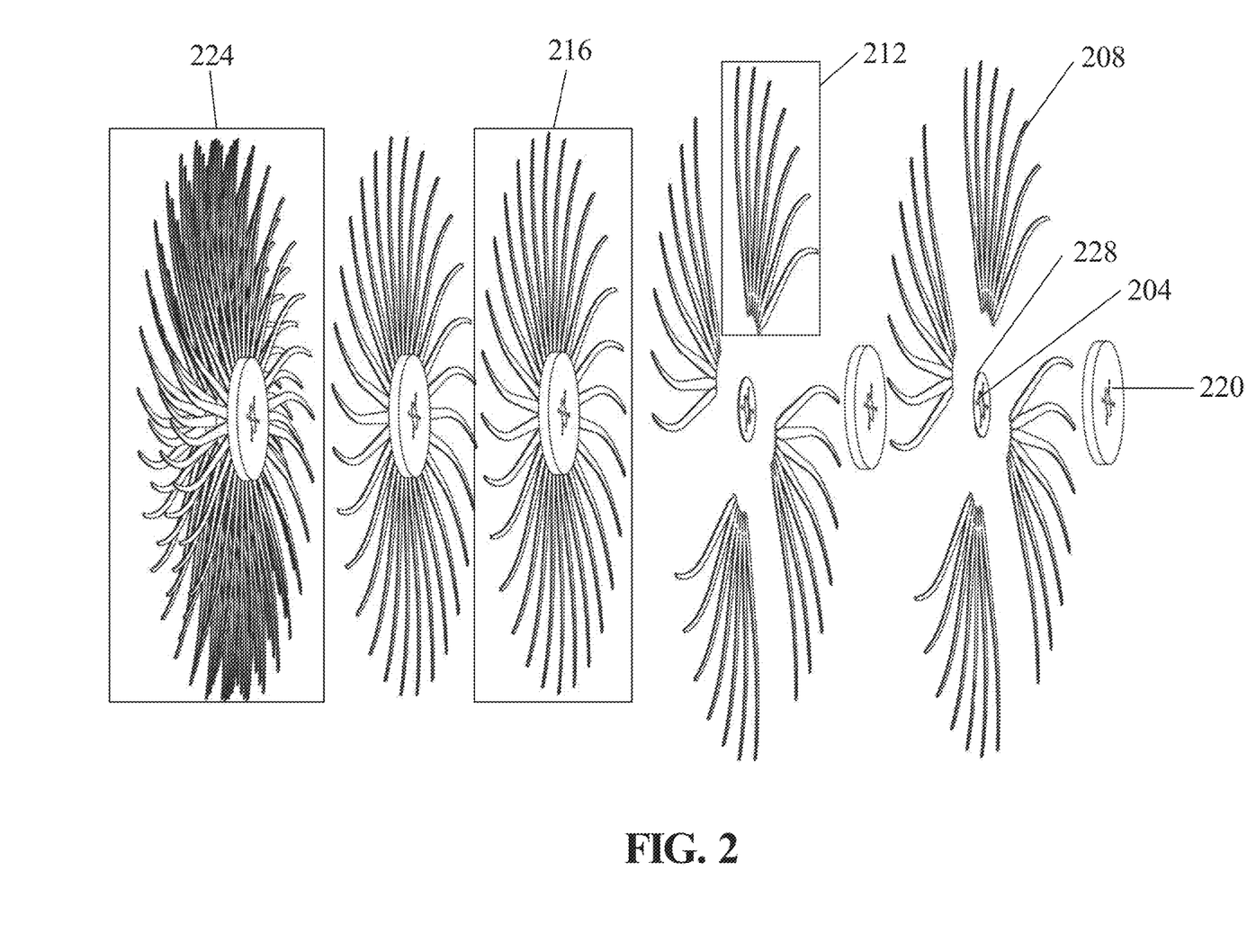
FIG. 2 is an exemplary embodiment of an assembled layers.

Referring now to FIG. 2, an exemplary embodiment of assembled layers 224 component of top wrap assembly is illustrated. Central to assembly may be hub 228. Hub 228 may serve as the foundation to which fingers radiate. For the purposes of this disclosure, "hub" refers to a central part of an assembly or part, from which fingers radiate. The assembly may include a central bore 204, designed to allow the passage of at least one shaft (shown below) through its center. Surrounding the central bore are plurality of fingers 208, which may be elongated, curved projections extending outward from the core forming the star 212. Each star 212 is a part of the assembled layer 216, in this embodiment, assembled layer 216 may include both assembled first and second layers, indicating a potential material or density differentiation for varied functionality. Components may be held together by an industrial adhesive, fingers may be bonded to the hubs, or alternatively, fingers 208 may be anchored into slots that are included in the hub 228. In some embodiments, fingers 208 may be removably attached to hub 228. In some embodiments, fingers 208 may be permanently attached or integral to hub 228.

Still referring to FIG. 2, assembled layer 216 may be shown in greater detail, comprising four sets of stars 212 with seven fingers 208 radiating from the centers. Stars may be arranged in a manner to form a cohesive cleaning or operational surface, with fingers 208 designed to engage with the surface of the object being treated by the top wrap assembly. Stars 212 may be depicted in two contrasting colors, for example, black and green, which may represent different materials or properties. For instance, the black stars may be made from a material designed for stiffness, while the green stars may be composed of a more abrasive material. The color-coding can serve as an indicator of the stars' functional differentiation, with each color tailored to specific cleaning tasks, allowing top wrap assembly to address a variety of cleaning challenges efficiently.

With continued reference to FIG. 2, spacer foam 220 may be placed between assembled layer 216, providing separation and potentially aiding in vibration dampening or maintaining the structural integrity of the assembly. Spacer foam 220 may be equipped with double-sided adhesion, allowing for secure attachment to adjacent layers and facilitating easy assembly or replacement.

With continued reference to FIG. 2, may further illustrate assembled layers 224, assembled layers may consist of a stack of four assembled layers, presumably representing the full bun configuration. Stack may highlight the layering strategy and the integration of various materials, densities, or types of foam to achieve a comprehensive cleaning effect or other functional outcomes.

Figure 3:
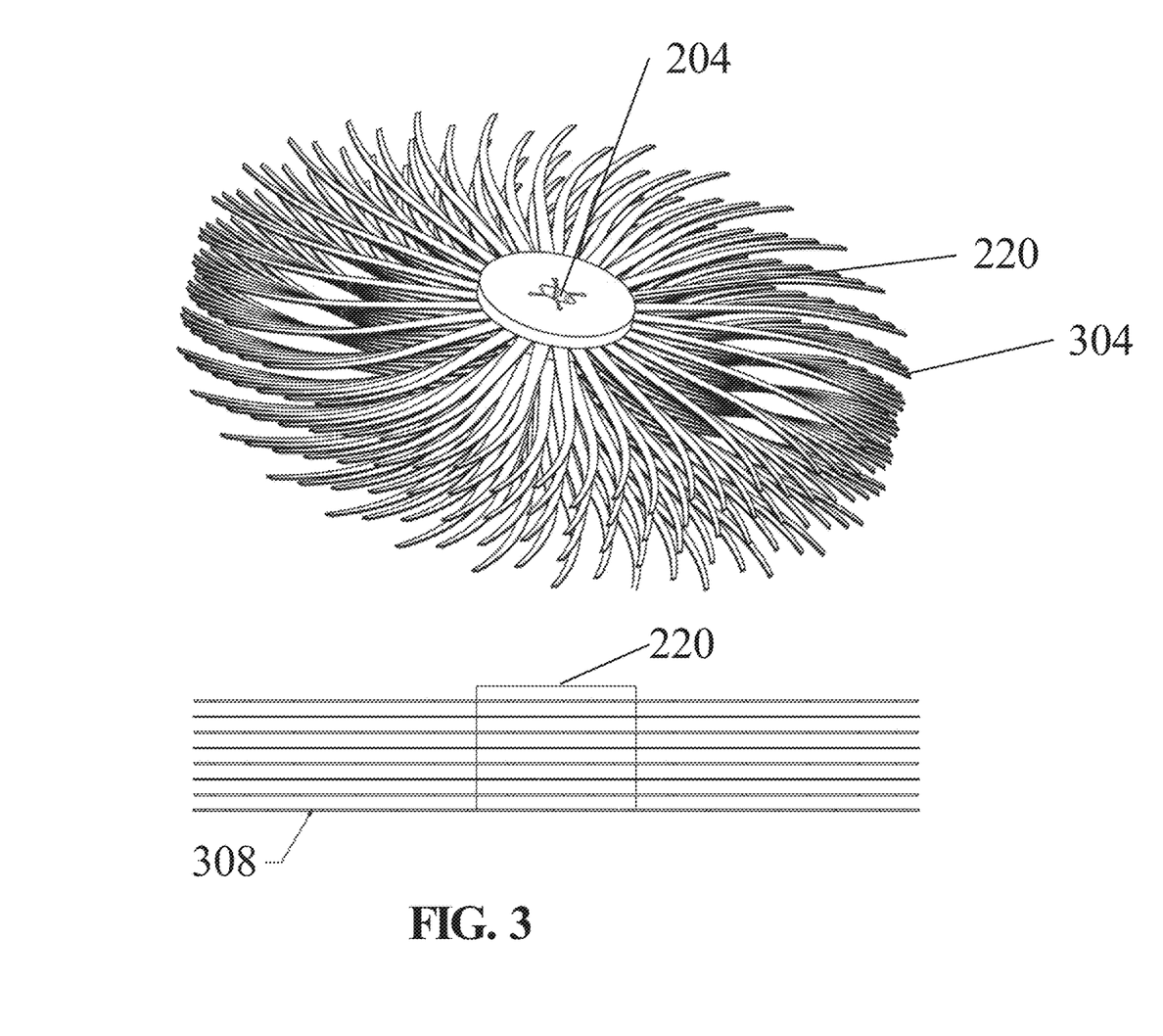
FIG. 3 is an exemplary embodiment of a full bun configuration.

Referring now to FIG. 3, an exemplary embodiment of a full bun 304 is illustrated. Full bun configuration may include a plurality of spacer foams 220. Full bun configuration may include eight layers as part of top wrap assembly. The embodiment shows the full bun in a side view 308, illustrating the layered structure with the first layer positioned at the bottom, indicating the start of the layer sequence. Full bun 304 is depicted in a top view, revealing a concentric and symmetrical arrangement of multiple elongated fingers extending radially from a central hub. For example, fingers may be in color, alternating shades of black and green, suggest a design that may employ different materials or densities to fulfill various operational functions, such as cleaning or buffering. The side view 308 provides a clear representation of the layered stacking order, with the black bottom layer potentially offering a foundation with specific characteristics, such as stiffness or abrasiveness, to interact with the surface being treated by the top wrap assembly. In an non-limiting example, full bun configuration with alternating layers of fingers, may be angularly offset to optimize the assembly's cleaning efficiency. Angular offset may ensure that the first set of fingers are positioned in the gaps between the second set of fingers, may provide a more comprehensive coverage area during operation. Angular offset may be equivalent to half the angle between each finger in star, may ensure that the fingers interleave without interference. For example, if the angle between each finger in star is 20 degrees, then the angular offset for the alternating layers may be set at 10 degrees. The angular displacement may allow the fingers to engage with and clean surfaces, as each finger operates within its own space while collectively covering a larger area. The combination of first set and second set of fingers may allow for more effective cleaning, may enable apparatus to adeptly handle a variety of surfaces and contours with improved efficiency. This may be advantageous in ensuring thorough cleanliness across diverse applications. Secondly, the design may contribute to quieter operation, and may enhance user experience by reducing noise pollution, making it more suitable for use in noise-sensitive environments. Lastly, the geometry and arrangement of the fingers may reduce the likelihood of entanglement with vehicle accessories and/or structural attachments such as roof bars, racks, crossbars, tow hook, side mirrors, antennas, and the like. This minimizes potential damage and ensures a smoother, hassle-free cleaning process. Apparatus may offer a blend of efficiency, quiet operation, and safety that addresses common challenges faced in cleaning applications.

Figure 4A:
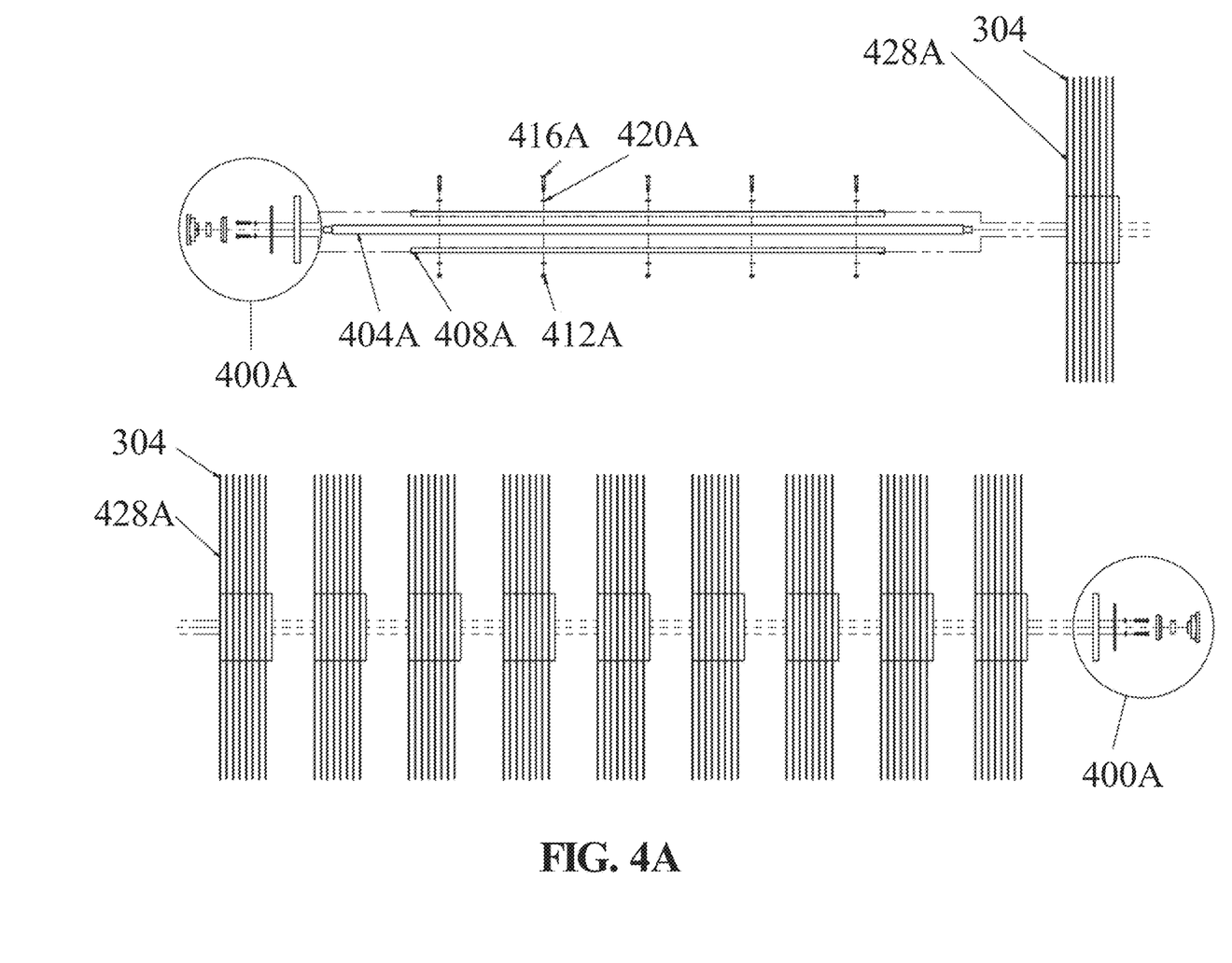
FIG. 4A is an exemplary embodiment of an assembly process of the top wrap assembly.

Referring now to FIG. 4A, an exemplary embodiment for an assembly process of the top wrap assembly is illustrated. Assembly process may include assembly of locking mechanism 400A. Central to the assembly may be shaft 404A, shaft 404A may serve as the backbone for attaching various components. Shaft 404A may extend longitudinally and may be designed to accommodate full bun 304 of the top wrap assembly.

Still referring to FIG. 4A, along shaft 404A, there may be a plurality of weldments 408A, could be depicted as W-channels in this embodiment. As used in this disclosure, a "weldment" is a unit formed by welding together components, creating a single piece from multiple parts. Weldments 408A may be strategically positioned and securely attached to shaft 404A, providing additional structural support and serving as mounting points for other components.

With continued reference to FIG. 4A, assembly process may include nuts 412A. As used in this disclosure, a "nut" is a mechanical fastener with an internally threaded hole. Nuts may be designed to be used in conjunction with a corresponding bolt or threaded shaft, for assembling multiple parts together. Typically, nuts may be turned to run up or down the length of the bolt's thread, clamping the bolted components together. Nuts may come in various shapes, sizes, and materials, each suitable for specific applications and load requirements. Nuts may provide secure, reliable, and easily adjustable connections within mechanical assemblies, such as in the construction of top wrap assembly. For example, nyloc nuts may be used in this embodiment, which may be used throughout the assembly to ensure a secure and vibration-resistant connection of components. Nyloc nuts may be paired with bolts, bolts. In an embodiment, bolts may include hex head bolts 416A. Bolts may feature a six-sided head, ideal for a secure grip and torque when tightened with a wrench. Bolts may pass through flat washers 420A, which may be used to distribute the load of bolt and nut across a broader area, reducing pressure and preventing damage to the surface of assembled components. The combination of nyloc nuts, hex head bolts, and flat washers provides a robust and durable fastening solution, essential for maintaining the structural integrity and operational reliability of assembly. The assembly process may involve the use of washers 420A, in this embodiment, washer may be flat washers. A "Washer," as used in this disclosure, is a thin plate with a hole, which is used to distribute the load of a fastener, such as a bolt or nut. Flat washers, which may be used in an embodiment, may provide a smooth, even surface for the bolt and nut to press against, which may help to distribute the force evenly and prevent damage to the surface being fastened. Washers may be useful in preventing pull-through or damage to softer materials and can also help to reduce friction and prevent loosening due to vibration. Flat washers 420A may serve to evenly distribute the load of bolts and nuts across a larger surface area, minimizing the risk of damage to the components being fastened. Bolts, here exemplified by hex head bolts 416A, may secure various components of the assembly together. Bolts may provide clamping force that holds the parts in place, ensuring a firm and stable connection that can withstand operational stresses and vibrations. Weldments 408A may offer additional structural support. When assembled, weldments 408A may be attached to shaft. The synergy of bolts, washers, and weldments 408A in assembly process may ensure each component is securely affixed, maintain the alignment and enhance the overall durability of the top wrap assembly.

With continued reference to FIG. 4A, full bun 304 is shown in a side view, indicating the stacking direction from right to left. This perspective may reveal the layered nature of the full bun, with assembled first layer 428A positioned at the bottom of the stack as it is arranged on the fixture. The non-spacer side of assembled first layer 428A, in an example, assembled first layer may be colored black, indicates the orientation and material differentiation within the bun.

With continued reference to FIG. 4A, further exemplifies a methodical approach to constructing the top wrap assembly, where the components may be arranged in a specific sequence to form the final product. The stacking direction and the use of specialized components such as W-channel weldments, nyloc nuts, hex head bolts, and flat washers, ensure that full bun 304 is securely and accurately assembled along shaft 404A, ready for operational deployment. The central portion of weldment may be designed with a curvature that allows it to fit around shaft. The curved section may be semi-circular or U-shaped, conforming closely to the outer diameter of the shaft to ensure a secure and precise fit.

With continued reference to FIG. 4A, in some embodiments, assembly of apparatus 100 may start at a driver's side end. In some embodiments, assembly of apparatus 100 may start at a passenger's side end. For the purposes of this disclosure, a "driver's side end" is the end that is located over the driver's compartment in a car when the apparatus is being used. For the purposes of this disclosure, a "passenger's side end" is the end that is located over the passenger's compartment in a car when the apparatus is being used.

Figure 4B:
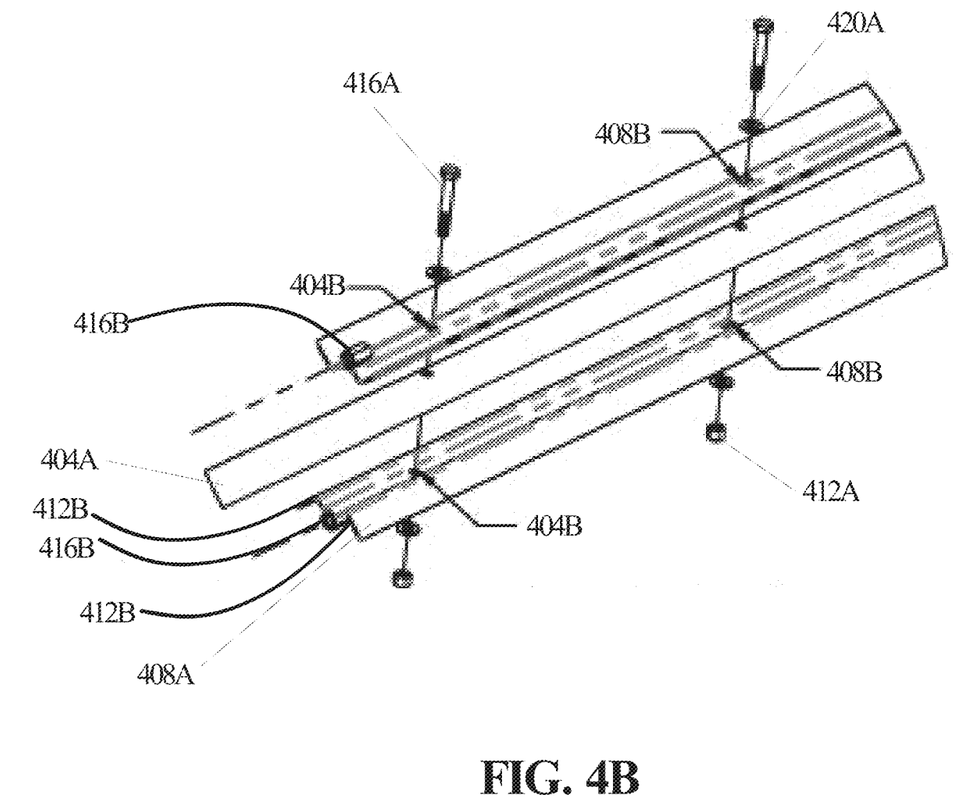
FIG. 4B is an exemplary embodiment of a shaft component.

With continued reference to FIG. 4A, assembly of apparatus 100 may include a step of bolting together the shaft assembly. Shaft assembly is described throughout this disclosure, but particularly with reference to FIG. 4B. In some embodiments, a next step of assembly may include assembling one of the two locking mechanisms 400A in FIG. 4A. In some embodiments, a next step of assembly may include installing one spacer foam against a non-adhesive side of end plate 424C, described with reference to FIG. 4C. In some embodiments, this may include removing a liner of end plate 424C that is facing the foam spacer. In some embodiments, a next step of assembly may include installing a bun 304A. This may include inserting a bun around shaft assembly and moving the bun 304A down shaft assembly until it contacts the initial spacer foam. In some embodiments, bun 304A may be constructed by assembling alternating layers of stars and spacer foams. Assuming that the assembled locking mechanism 400A is located on the left side of apparatus 100, bun 304 may be constructed such that its leftmost feature is a star and its right most feature is a spacer foam. In another embodiment, assuming that the assembled locking mechanism 400A is located on the left side of apparatus 100, bun 304 may be constructed such that its leftmost feature is a star and its rightmost feature is a start as well; in this embodiment, assembly may include inserting a spacer foam between buns 304. In some embodiments, once all buns have been arranged on shaft assembly, a spacer foam may be placed adjacent to the last bun, such that its adhesive side is adjacent to the last bun. In some embodiments, assembly may continue with installing an end plate and bolts on the end. In some embodiments, assembly may continue with installing a screw cover with locking rings on both ends of apparatus 100. In some embodiments, assembly may continue by installing flange bearings on both ends of apparatus 100. Referring now to FIG. 4B, a detailed perspective of the shaft 404A and assembly is illustrated. Round hole 404B, may be a part of top wrap assembly. Shaft may feature a series of round holes 404B and oblong slots 408B along shaft length. Round holes 404B may be precisely drilled through shaft and weldment, may be intended for the secure attachment of various components or for the alignment during the assembly process.

With continued reference to FIG. 4B, alongside round holes 404B, a plurality of oblong slots 408B may be shown. Oblong slots may be elongated and permit adjustments along the length of shaft, accommodating variations in component placement and allowing for fine-tuning of assembly. Oblong slots 408B may provide a degree of flexibility in the positioning of attachments, applications may require precise alignment or tension adjustments.

Still referring to FIG. 4B, the orientation and distribution of round holes 404B and oblong slots 408B may increase the structural integrity and functional adaptability of the top wrap assembly. Round holes 404B and oblong slots 408B may enable the assembly to be customized for a wide range of applications, ensuring that the end product may be tailored to the specific needs of different operational environments.

With continued reference to FIG. 4B, shaft 404A and assembly may include a plurality of bolts 416A. Bolts 416A may be configured to pass through round holes 404B and oblong slots 408B on weldments 408A and/or shaft 404A. In some embodiments, shaft 404A and assembly may include a plurality of washers 420A. Washers 420 may be configured to sit between the head of bolts 416A and weldments 408A. In some embodiments, washers 420A may serve to distribute the force of head of bolts 416A over a larger surface area of weldments 408A. In some embodiments, shaft 404A and assembly may include a plurality of nuts 412A. In some embodiments, washers 420A may be configured to sit between nuts 412A and weldments 408A.

With continued reference to FIG. 4B, shaft 404A and assembly may include one or more flanges 412B. A "flange," for the purposes of this disclosure, is an edge that protrudes from an object. In some embodiments, flanges 412B may be flat. In some embodiments, flanges 412B may be curved. In some embodiments, flanges 412B may include one or more bends. In some embodiments, flanges 412B may include a diagonal, flat edge that joins to a v-shaped middle portion; for example, to form weldments 408A in the shape of a W. In some embodiments, flanges 412B may serve to increase the strength and rigidity of the assembly. For example, flanges 412B may serve to make the shaft 404A and assembly stronger in torsion.

With continued reference to FIG. 4B, shaft 404A and assembly may include one or more screw collars 416B. A "screw collar," for the purposes of this disclosure, is a cylindrical shell configured to accept one or more threaded fastener devices. For example, a screw collar 416B may be sized and configured to accept screw. In some embodiments, screw collar 416 may include a threaded interior surface configured to mate with the threads of a fastener device, such as a screw. In some embodiments, screw collar 416B may be affixed to an outer surface of weldments 408A. An "outer surface of weldment" is the surface of weldment that faces away from shaft 404A. In some embodiments, screw collar 416B may accept screw 416C as described below with respect to FIG. 4C. The mating of screw collar 416B and screw 416C may allow for end plate 424C and spacer foam 428C to be held to shaft 404A and assembly.

Referring to FIGS. 4A, 4B, and 3, in some embodiments, shape of central bore 204 in the spacer foam may be a shape other than circular. In some embodiments, central bore 204 may be specifically contoured to accommodate the distinctive geometry of the weldment's components. This includes flanges and screw collars that may be integral to the weldment's design. Central bore may be crafted to align with flanges, allowing them to pass through or fit snugly within the foam layers, thus ensuring a seamless integration of the weldment with the foam components. Additionally, central bore 204 may be designed to allow easy access to screw collars on the weldment, facilitating the attachment of screws or bolts from the locking mechanism 400A. Locking mechanism 400A may fasten the foam layers to the weldment and shaft, enhancing the structural stability and overall functionality of top wrap assembly. Locking mechanism 400A may involve the placement of screws or bolts through screw collars of weldment. Fasteners may be passed through pre-designed openings in locking mechanism, 400A aligned with the threaded holes or receptacles in the screw collars. As screws or bolts are inserted, they may be guided by the screw collars to ensure proper alignment. Fasteners may be then tightened.

Figure 4C:
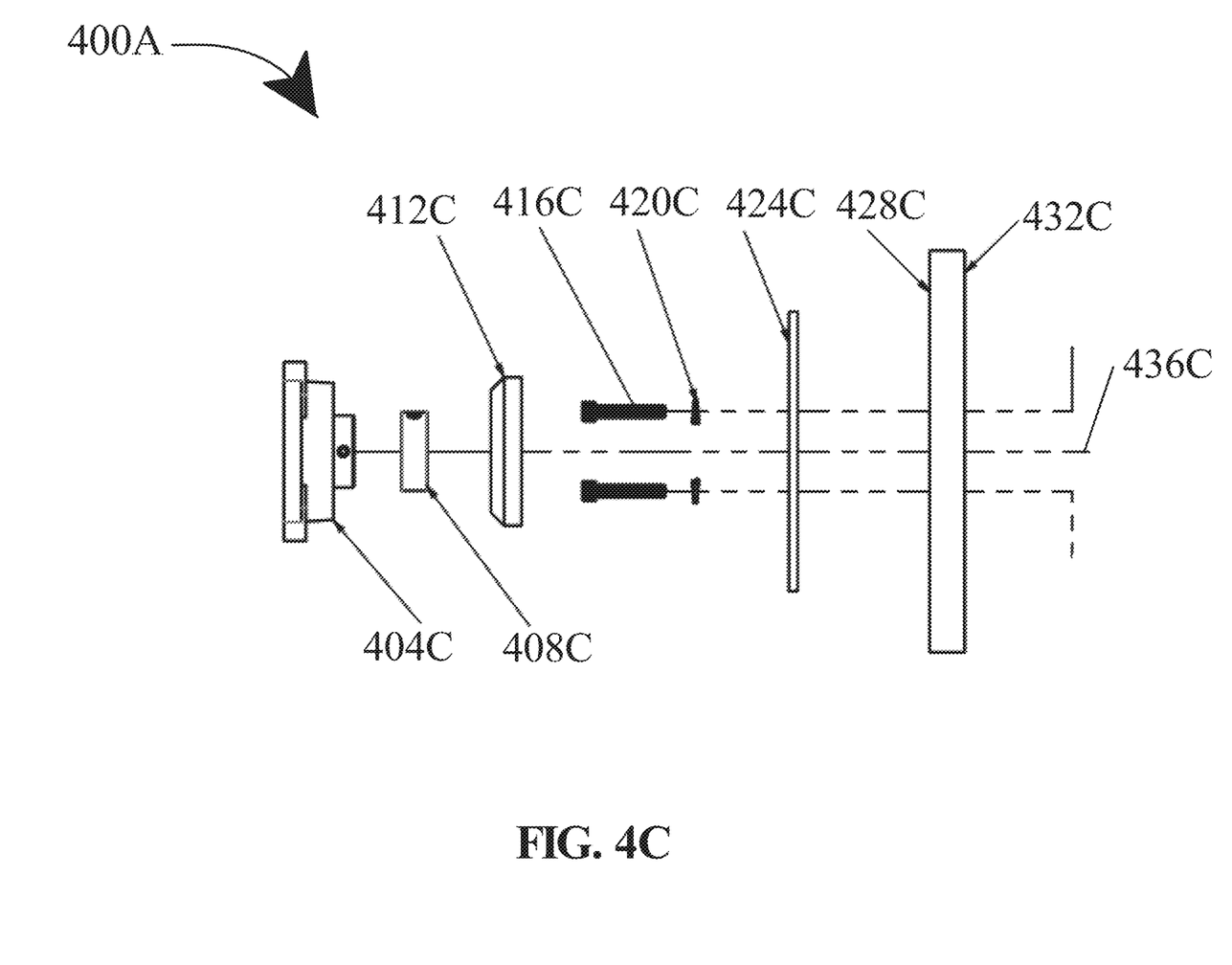
FIG. 4C is an exemplary embodiment of a locking mechanism.

Referring now to FIG. 4C, an exemplary embodiment of the locking mechanism 400A is illustrated, locking mechanism may be utilized within the top wrap assembly. Central to locking mechanism 400A may be flange bearing 404C, a component that facilitates the smooth rotation of the shaft within the assembly. Affixed onto shaft may be a set screw locking collar 408C, designed to maintain the axial position of the shaft by securely clamping onto it. The set screw locking collar 408C may ensure components such as the flange bearing 404C are firmly held in place, preventing lateral movement along the shaft. Screw cover cap 412C may protect the set screws, screw cover cap 412C may shields the screws from environmental factors and may also provide a neat and finished appearance to the assembly. Screws 416C may be standard fasteners, are used in conjunction with split lock washers 420C, which may offer added security by preventing the screws from loosening due to vibrations or rotational forces. End plate 424C may be depicted at one end of the locking mechanism 400A. End plate 424C may serve as an anchoring point, allowing the locking mechanism to be attached to an external structure, thereby securing the entire assembly in place. Spacer foam 428C may also be included in locking mechanism. Spacer foam 428C may provide a cushioning layer between the locking mechanism components and other parts of the assembly. The adhesive side of the spacer foam 432C may ensure to remain affixed to the desired surface without shifting during operation. In some embodiments, locking mechanism may include a central axis 436C. In some embodiments, flange bearing 404C, set screw locking collar 408C, Screw cover cap 412C, End plate 424C, and/or Spacer foam 428C may be positioned such that central axis 436C passes through their center. In some embodiments, shaft may extend along central axis 436C.

With continued reference to FIG. 4C, assembly of locking mechanism 400A may include placing an adhesive side of spacer foam 428C next to a bun 304. Assembly may continue with placing end plate 424C against spacer foam 428C. Assembly may continue with using screws 416C to fasten end plate 424C and spacer foam 428C to shaft assembly. In some embodiments, this may include placing washers 420C around screw 416C before screws 416C are threaded through end plate 424C and spacer foam 428C into shaft assembly. Assembly may continue with placing a screw cover cap 412C over the heads of screws 416C. In some embodiments, locking collar 408C may be installed against screw cap 412C. In some embodiments, bearing 404C may be installed.

Figure 5:
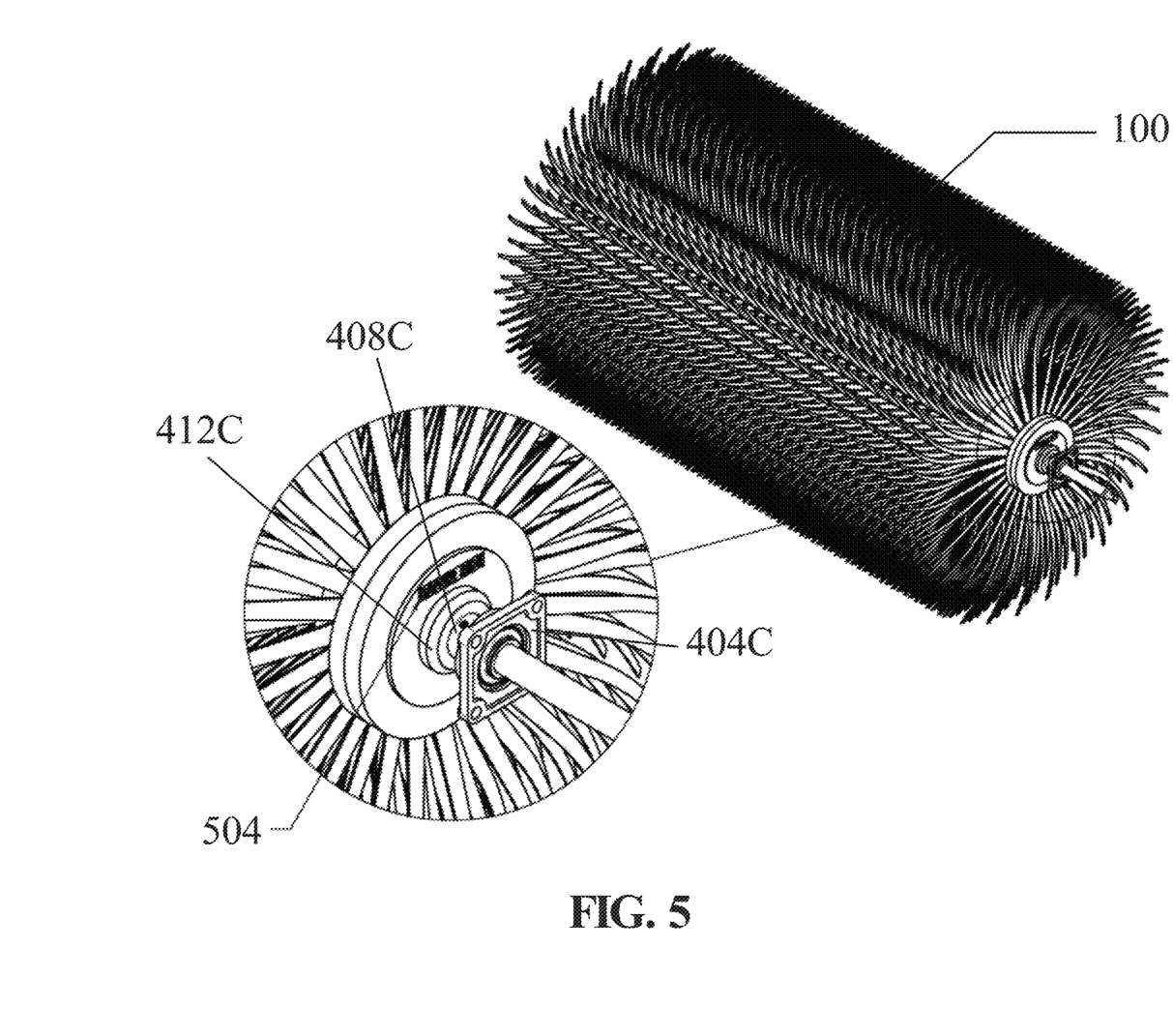
FIG. 5 is an exemplary embodiment of an apparatus for a top wrap assembly.

Referring now to FIG. 5, apparatus 100 for a top wrap assembly is illustrated. This assembly is designed for applications such as cleaning or surface treatment, where an array of bristle-like elements provides thorough coverage and effective interaction with various surfaces. A detailed view of a portion of the assembly may include split lock washer 504, split lock washer 504 may be a type of fastener that helps to prevent loosening due to vibration and torque. When placed between the nut or bolt head and the mating surface, the split in the washer creates a spring force that provides more friction and resistance to rotation.

Still referring to FIG. 5, in this embodiment, split lock washer 504 may be part of a fastening system that secures the components of the top wrap assembly, allowing for the operational functionality of apparatus 100. The washer's design ensures that the various components, May include the buns, stars, and fingers of the assembly, are securely locked in place, reducing the risk of component separation or failure during the operation of the apparatus.

Figure 6:
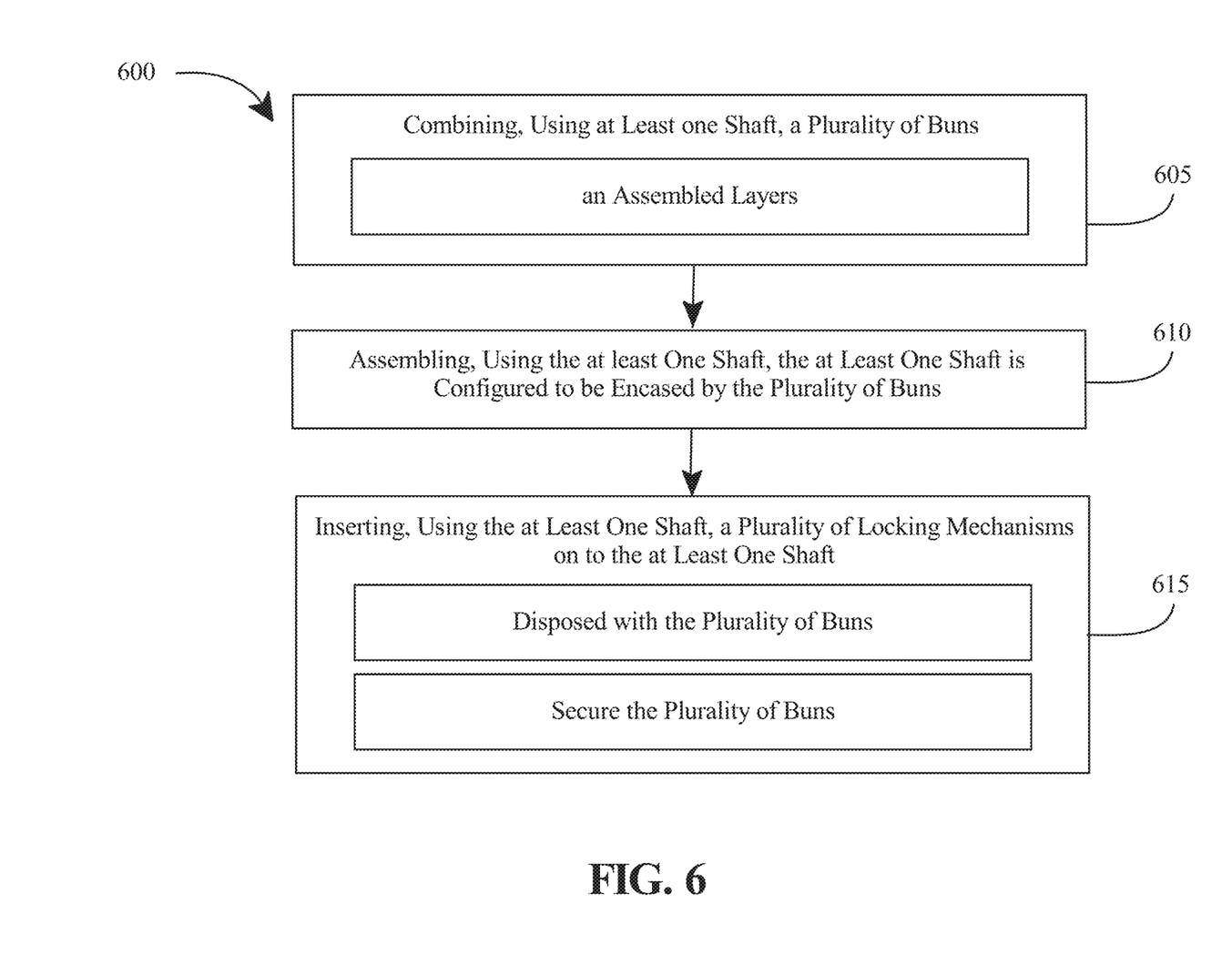
FIG. 6 is a flow diagram illustrating a method for assembling a top-wrap assembly.

Referring now to FIG. 6, a flow diagram of an exemplary method 600 for a top wrap assembly is illustrated. Method 600 includes step 605 of combining, using at least one shaft, a plurality of buns, wherein the plurality of buns comprises an assembled layers. This may be implemented, without limitation, as described above with reference to FIGS. 1-5.

With continued reference to FIG. 6, method 600 includes a step 610 assembling, using the at least one shaft, the at least one shaft is configured to be encased by the plurality of buns. This may be implemented, without limitation, as described above with reference to FIGS. 1-5. With continued reference to FIG. 6, method 600 includes a step 610 of inserting, using the at least one shaft, a plurality of locking mechanisms onto the at least one shaft, wherein the at the plurality of locking mechanism disposed with the plurality of buns, wherein the plurality of locking mechanism is configured to secure the plurality of buns onto the at least one shaft. This may be implemented, without limitation, as described above with reference to FIGS. 1-5.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a top wrap assembly, wherein the top wrap assembly comprises:
    a plurality of buns, wherein the plurality of buns comprises a plurality of assembled layers, wherein:
        the plurality of assembled layers comprises a plurality of spacer foams located between the plurality of assembled layers; and
        the plurality of buns defines a central bore;
    at least one shaft, wherein the at least one shaft is disposed in alignment with a central axis of the plurality of buns, wherein the at least one shaft passes through the central bore, wherein the at least one shaft comprises a plurality of weldments affixed to the shaft, and wherein each of the plurality of weldments defines a plurality of round holes and a plurality of oblong slots; and
    a plurality of locking mechanisms, wherein each locking mechanism is configured to engage with the plurality of buns and the at least one shaft, and wherein the locking mechanism is configured to secure the plurality of buns and the at least one shaft.

2. The apparatus of claim 1, wherein the plurality of assembled layers comprises:
    at least one assembled first layer, wherein the at least one assembled first layer comprises a first set of stars comprising four individual stars with a first plurality of fingers;
    at least one assembled second layer, wherein the at least one assembled second layer comprises a second set of stars comprising four individual stars with a second plurality of fingers, wherein the spacer foam configured to separate the at least one assembled first layer and the at least one assembled second layer.

3. The apparatus of claim 2, wherein each finger of the first set of stars and the second set of stars comprises a swept shape.

4. The apparatus of claim 3, wherein each finger of the first set of stars and the second set of stars comprises a straight portion and a curved portion.

5. The apparatus of claim 4, wherein the straight portion of each finger extends to fifty percent of total length of each finger and the curved portion increases in curvature towards a tip of each finger.

6. The apparatus of claim 1, wherein the top wrap assembly comprises a full bun configuration comprising an alternating arrangement of assembled first layers and assembled second layers.

7. The apparatus of claim 1, wherein the locking mechanism further comprises:
    a spacer foam positioned between the locking mechanism and the plurality of buns;
    an end plate configured to anchor the locking mechanism to an external structure; and
    a flange bearing configured to facilitate a rotational movement of the shaft with respect to the external structure.

8. The apparatus of claim 1, wherein the plurality of assembled layers comprises an individual star with a plurality of fingers.

9. The apparatus of claim 8, wherein the plurality of assembled layers comprises a plurality of stars, wherein each of the plurality of stars comprises seven fingers.

10. The apparatus of claim 1, wherein the top wrap assembly comprises a counterweight system, wherein the counterweight system is configured to balance the top wrap assembly.

11. A method for assembling a top wrap assembly, wherein the method comprises:
    combining, using at least one shaft, a plurality of buns, wherein the plurality of buns comprises a plurality of assembled layers, wherein combining the plurality of buns comprises inserting a spacer foam between each of the plurality of assembled layers, wherein the at least one shaft comprises a plurality of weldments affixed to the shaft, and wherein each of the plurality of weldments defines a plurality of round holes and a plurality of oblong slots;
    assembling, using the at least one shaft, the at least one shaft is configured to be encased by the plurality of buns; and
    inserting, using the at least one shaft, a plurality of locking mechanisms onto the at least one shaft, wherein the at least one shaft is disposed in alignment with a central axis of the plurality of buns, wherein the plurality of locking mechanism is configured to secure the plurality of buns onto the at least one shaft.

12. The method of claim 11, wherein the locking mechanism comprises:
    a spacer foam positioned between the locking mechanism and the plurality of buns;
    an end plate configured to anchor the locking mechanism to an external structure; and
    a flange bearing configured to facilitate a rotational movement of the shaft with respect to the external structure.

13. The method of claim 11, wherein the plurality of assembled layers comprises an individual star with a plurality of fingers.

14. The method of claim 13, wherein the plurality of assembled layers comprises
    at least one assembled first layer, wherein the at least one assembled first layer comprises a first set of stars comprising four individual stars with a first plurality of fingers;
    at least one assembled second layer, wherein the at least one assembled second layer comprises a second set of stars comprising four individual stars with a second plurality of fingers, wherein the spacer foam configured to separate the at least one assembled first layer and the at least one assembled second layer.

15. The method of claim 14, wherein each finger of the first set of stars and the second set of stars comprises a swept shape.

16. The method of claim 15, wherein each finger of the first set of stars and the second set of stars comprises a straight portion and a curved portion.

17. The method of claim 16, wherein the straight portion of each finger extends to fifty percent of total length of each finger and the curved portion increases in curvature towards a tip of each finger.

18. The method of claim 11, wherein the top wrap assembly comprises a full bun configuration comprising an alternating arrangement of assembled first layers and assembled second layers.

* * * * *